March 2, 1943.  R. B. CAMPBELL  2,312,877
FLUID PRESSURE REGULATING VALVE
Filed Sept. 9, 1941
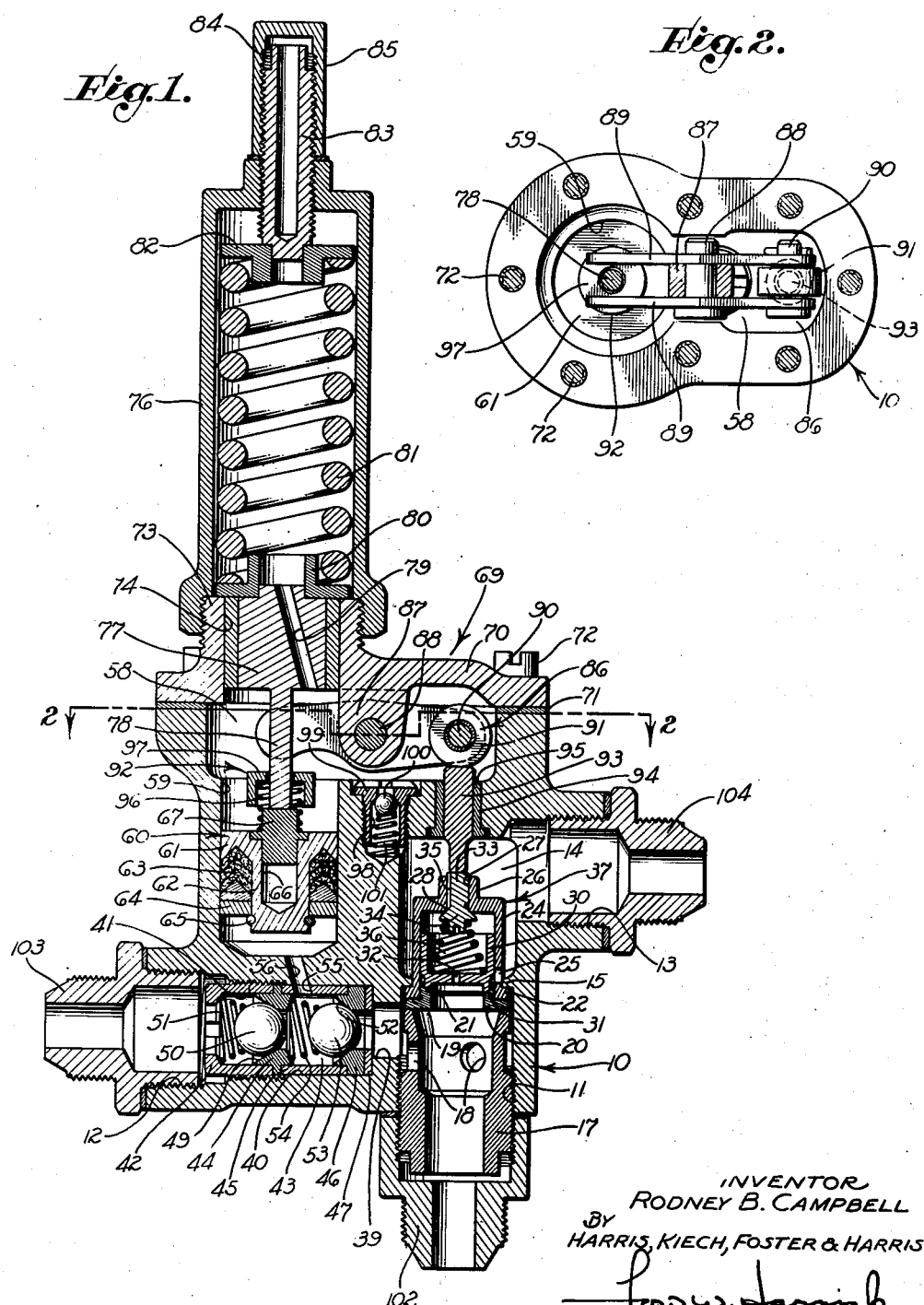
INVENTOR
RODNEY B. CAMPBELL
BY HARRIS, KIECH, FOSTER & HARRIS
FOR THE FIRM
ATTORNEYS Patented Mar. 2, 1943

2,312,877

UNITED STATES PATENT OFFICE 2,312,877

FLUID PRESSURE REGULATING VALVE

Rodney B. Campbell, North Hollywood, Calif., assignor to John Eley, Jr., Los Angeles, Calif.

Application September 9, 1941, Serial No. 410,156

7 Claims. (Cl. 137—153)

My invention relates to valve devices, and more particularly to a valve device adapted to maintain the fluid pressure in a pressure system below a predetermined maximum value.

This invention is an improvement on the device shown and claimed in my copending application Serial No. 258,975, filed February 28, 1939, for Regulating valve.

The invention is of particular utility in connection with a pressure operating system employing a liquid, such as oil, under relatively high pressure, and will be described in connection therewith, although it will be understood that the invention can be used in conjunction with other types of fluid pressure systems and I do not intend to be limited to the type described.

It is a primary object of my invention to provide a valve device for a fluid operating system, the valve device and fluid system being so constructed that when the pressure of fluid in a working portion of the fluid system rises above a predetermined maximum value the valve device will open and cause the pressure in the working system to be maintained at or drop below said maximum value. Another object of the invention is to provide such a valve device which includes check valve means for holding the working pressure in the working portion of the fluid system.

A further object of my invention is to provide such a regulating valve device including a high pressure inlet and outlet and a low pressure exhaust port, in which a rise in fluid pressure in the inlet above a predetermined maximum will open a pressure relief valve connecting the inlet and the exhaust port, but in which a rise in pressure in the outlet will not operate to open such valve.

Still another object of the invention is to provide such a regulating valve device including a control piston having one end communicating with the inlet, operating mechanism for opening a pressure relief valve between the inlet and the exhaust port in response to rises in fluid pressure in the inlet, and means for bleeding the other side of the piston to the exhaust port.

Another object of the invention is to provide in a regulating valve device of the character described hereinabove a pressure relief valve incorporating means for locking the relief valve in closed position. I prefer to accomplish this by the use of a pressure relief valve having a differential area valve member open on both ends to fluid pressure in the inlet to provide a fluid lock for the valve member.

It is another object of my invention to provide a regulating valve device of the type described hereinabove in which a delayed action mechanism is provided for delaying the closure of the pressure relief valve upon a drop in pressure in the outlet below a predetermined operating pressure.

Another object of the invention is to provide such a regulating valve device in which the control piston has one side in open communication with a chamber formed between two check valves both opening from the inlet to the outlet but preventing a reverse flow of fluid.

A further object of my invention is to provide a regulating valve such as described which is simple to assemble and repair, and which incorporates a number of novel details of construction to this end.

Other objects and advantages will appear from the following specification and the drawing, which is for the purpose of illustration only, and in which:

Fig. 1 is a longitudinal sectional view taken through my invention.

Fig. 2 is a cross-sectional view taken on the line 2—2 of Fig. 1.

Referring to the drawing, I show a housing 10 provided with a threaded inlet 11, a threaded outlet 12, and a threaded discharge or pressure relief port 13. Formed in the housing 10 in axial alignment with the inlet 11 is a valve chamber 14 which intersects the pressure relief port 13 and is separated from the inlet 11 by an annular shoulder 15 formed therebetween. Threaded into the inlet 11 is a tubular inlet plug 17 provided with radial ports 18, the inner end of the inlet plug abutting against a flange face 19 of a valve seat member 20 which is provided with a conical valve seat 21 facing toward the pressure relief port 13. The valve seat member 20 abuts against a flange end 22 of a cylindrical valve guide 24 which is rigidly held in engagement against the annular shoulder 15 by screwing the inlet plug 17 into the inlet 11, as will be well understood by those skilled in the art. The cylindrical valve guide 24 is provided with one or more radial openings 25 communicating with the valve chamber 14, and the inner end of the valve guide is provided with a tubular extension 26 having a bore 27, there being a control valve seat 28 formed on the inner end of the bore 27. Slidably retained in the cylindrical valve guide 24 is a main valve member 30 of substantially cup-shape, which is provided with a seating face 31 adapted to cooperate with the main valve seat 21, the main valve member having a restricted orifice 32 therein communicating between the interior of the tubular inlet plug 17 and the interior of the cylindrical valve guide 24. Slidably retained in the bore 27 of the tubular extension 26 is a control valve member 33 having a valve head 34 thereon adapted to cooperate with the control valve seat 28, and having a longitudinal channel 35 formed therein. A relatively weak compression spring 36 engages both the valve head 34 and the main valve member 30, tending to hold the same apart and to maintain the control valve member 33 in axial alignment with the bore 27. The control valve member 33 and the control valve seat 28 comprise a control valve means of the invention, and the main valve member 30 and the main valve seat 21 comprise a main valve means of the invention, and taken together they comprise a pressure relief valve means 37.

The inlet 11 and the outlet 12 are connected by a fluid flow passage 39 having a counterbore 40 the outer end of which is threaded at 41 to receive a threaded cup-shaped fitting 42 of a check valve means 43 of the invention. The check valve means 43 also includes a first valve seat ring 44 which is engaged by the cup-shaped fitting 42 and which in turn abuts against a spacer sleeve 45, the other end of which engages against a second valve seat ring 46 which abuts against a washer 47. The first valve seat ring 44 is provided with a conical valve seat 49 on which is normally retained a ball valve element 50 by a compression spring 51, and the second valve seat ring 46 is provided with a conical valve seat 52 on which is normally retained a ball valve element 53 by a compression spring 54. Formed in the spacer sleeve 45 is a radial port 55 which communicates with a fluid control passage 56 formed in the housing 10.

The housing 10 is open on one side to provide a control chamber 58 which is intersected by a cylinder bore 59, the inner end of which communicates with the fluid control passage 56. Slidably disposed in the cylinder bore 59 is a piston means 60, having an end member 61 provided with a hub 62 on which is carried chevron packing 63 held against the end member 61 by an annular end plate 64 secured in place upon the hub 62 by a snap ring 65. The hub 62 is provided with a bore 66 in which is fixed an engagement member 67, as by press-fitting or otherwise.

The control chamber 58 is closed by a closure means 69 which includes a closure plate 70 separated from the housing 10 by a suitable gasket 71 and secured thereto by bolts 72. The closure plate 70 is provided with a threaded boss 73 which is provided with a bore 74 which is preferably axially aligned with the cylinder bore 59. Threaded on the threaded boss 73 is a spring housing 76. Slidably disposed in the bore 74 is a slidable member 77 guided for axial movement by the bore 74 and having a stem 78 adapted to engage the engagement member 67 of the piston means 60. The member 77 is also provided with a longitudinal opening 79 therein and has secured to the upper end thereof a centering flange 80 which is engaged by the lower end of a relatively stiff compression spring 81, the upper end of which engages an annular plate 82 fixed on a threaded stem member 83 which is threaded through the spring housing 76 and has a square head 84 on its upper end so as to permit the application of a wrench thereto to tighten or loosen the compression adjustment on the compression spring 81. A dust cap 85 is preferably threaded onto the upper end of the stem member 83 and tends to hold the same in adjusted position.

On the under side of the closure plate 70 is formed a depending lug 87 on which is pivoted, as by a pivot pin 88, a pair of parallel arm members 89, the leftward ends of which, as seen in Fig. 1, straddle the stem 78, and the rightward ends of which are secured together by a hub pin 90 also carrying a rotatable roller 91 held between the arm members 89. The rotatable roller 91 engages the upper end of an actuating member 93 slidably disposed in a bushing 94 suitably secured in a bore 95 of the housing 10, the actuating member extending into the valve chamber 14 and engaging the upper end of the control valve member 33. Carried on the engagement member 67 by a spring 96 is a cup-shaped element 97 through which the stem 78 extends, and which is adapted to be engaged by or to engage the left ends of the arms 89, the spring 96 and the element 97 comprising an accelerating means 92 of the invention. The pivoted arm members 89 with the roller 91 comprise an actuating or connecting means 86 of the invention, which operatively connects the piston means 60 and the pressure relief valve means 37.

Also formed in the valve housing 10 so as to communicate between the control chamber 58 and the valve chamber 14 is a threaded bleeder valve bore 98 into which is threaded a valve sleeve 99 having a ball valve member 100 therein normally held in seated position by a relatively weak compression spring 101, which constitutes a bleeder valve means of the invention for permitting fluid to bleed from the chamber 58 to the chamber 14.

As shown, an inlet pipe fitting 102 is threaded onto the outer end of the tubular inlet plug 17 so that a suitable supply pipe (not shown) may be attached thereto so as to communicate with the inlet 11, an outlet pipe fitting 103 is threaded into the outlet 12 so as to permit the ready attachment of an outlet pipe (not shown) so as to communicate with the outlet 12, and a pressure relief pipe fitting 104 is threaded into the pressure relief port 13 so as to permit a pressure relief pipe (not shown) to be readily attached to the housing.

The invention is adapted to be installed in a fluid pressure system such as shown in said patent application Serial No. 258,975, with the inlet pipe fitting 102 connected to a suitable source of fluid under relatively high pressure (not shown), the outlet pipe fitting 103 suitably connected to a point of use of the high pressure fluid flowing into the inlet pipe fitting 102, and the pressure relief pipe fitting 104 being suitably connected back to the low pressure side of the source of fluid, as will be understood in the art.

In operation, fluid under relatively high pressure flows into the device through the inlet pipe fitting 102, passing through the tubular inlet plug 17 and radially outward therefrom through the radial ports 18 into the fluid flow passage 39. The pressure of the fluid in the fluid flow passage 39 moves the ball valve elements 53 and 50 in sequence off their seats so as to permit the flow of fluid under pressure outwardly through the outlet 12 and the outlet pipe fitting 103 to the point of use of the pressure fluid.

Pressure fluid flowing through the fluid flow passage 39 also flows outwardly through the radial port 55 and the fluid control passage 56 into the lower end of the cylinder bore 59, tending to move the piston means 60 upwardly in the cylinder bore 59. Since the stem 78 of the slidable member 77 engages the engagement member 67 of the piston means 60, upward movement of the piston means 60 is counteracted by the compression of the compression spring 81. The compression of the compression spring 81 is initially adjusted by rotation of the stem member 83, which constitutes an adjustment means of the invention, so as to exert a predetermined counteracting force on the piston means 60 tending to maintain it in its lowermost position. In using my invention in an aircraft hydraulic system, it is standard practice to set the compression spring 81 so as to balance a fluid pressure of approximately 2000 pounds per square inch on the lower end of the piston means 60, although, obviously, the spring may be adjusted as desired. Thus, if the pressure of the pressure fluid flowing through the fluid flow passage 39 and the check valve means 43 from the inlet 11 to the outlet 12 rises above the value for which the compression spring 81 is initially adjusted, this rise in pressure is communicated to the lower end of the piston means 60 to cause the same to move upwardly against the action of the compression spring 81.

Upon upward movement of the piston means 60, the cup-shaped element 97 engages the left ends of the arm members 89 to fully compress the spring 96, following which continued upward movement of the element 97 causes the arm members to rotate about the pivot pin 88, thus moving the rightward ends thereof downwardly. Since the roller 91 engages the upper end of the actuating member 93, downward movement of the rightward ends of the arm members 89 likewise causes the actuating member 93 to move downwardly to similarly move downwardly the control valve member 33 to move the valve head 34 off its control valve seat 28. As soon as the valve head 34 moves off the control valve seat 28, the valve head 34 is relieved of the fluid pressure exerted thereon by the fluid in the interior of the cylindrical valve guide 24, and the spring 96 thereupon quickly expands to further rotate the arm members 89 to kick the control valve member 33 downwardly to its fully open position, which rapid opening of the control valve means is an important feature of the invention and results from the operation of the accelerating means 92. Since the interior of the cylindrical valve guide 24 is in open communication with the inlet 11 through the restricted orifice 32, as soon as the valve head 34 moves off the seat 28, fluid will flow from the interior of the cylindrical valve guide 24 through the longitudinal channel 35 formed in the control valve member into the valve chamber 14 and outwardly therefrom through the pressure relief port 13 and the pressure relief pipe fitting 104 which at all times is open to relatively low pressure. As soon as the control valve member 33 opens, the pressure behind the main valve member 30 within the cylindrical valve guide 24 will immediately drop, and a pressure differential will be impressed on the restricted orifice 32 which in turn is impressed on the main valve member 30, causing it to move upwardly away from the main valve seat 21, thus opening communication between the inlet 11 and the pressure relief port 13 through the radial openings 25 formed in the cylindrical valve guide 24. It is to be noted, however, that the cross-sectional area of the orifice 32 is greater than the cross-sectional area of the channel 35, which holds a substantial back pressure in the cylindrical valve guide 24 to prevent the main valve member 30 from opening too rapidly. Pressure fluid in the inlet 11 will then discharge directly through the radial openings 25 into the pressure relief port 13 and outwardly therethrough and through the pressure relief pipe fitting 104 to the low pressure side of the source of supply, and, as a consequence, fluid pressure in the fluid flow passage 39 will immediately drop below the fluid pressure in the outlet 12, and the ball valve elements 50 and 53 will immediately seat on their respective seats by reason of the action of their compression springs 51 and 54. The desired pressure will thus be held in the outlet 12, no fluid being allowed to reverse its flow through the check valve means 43. It is also to be noted that when the main valve member 30 is in the closed position shown in Fig. 1, the area thereof on the inlet side of the orifice 32 is substantially less than the area thereof on the end faced toward the control valve member 33, and, since the fluid pressures on both sides of the orifice 32 are equal when the main valve member is in this position, the differential areas thereof exposed to the fluid pressure will create a pressure differential on it tending to maintain it locked in its closed position, which is a further feature of the invention.

Fluid will continue to circulate from the inlet 11 to the pressure relief port 13 through the radial port 25 until the fluid pressure in the outlet drops below a predetermined minimum. When this occurs, the fluid pressure on the two sides of the ball valve element 50 will become unbalanced, and it will move off its seat 49 to permit fluid to discharge from the lower end of the cylinder bore 59 through the fluid control passage 56 and the radial port 55 into the outlet 12, to reduce the fluid pressure in the lower end of the cylinder bore. As soon as the fluid pressure in the lower end of the cylinder bore 59 falls to a point at which the total upward force exerted thereby on the piston means 60 is less than the downward force exerted on the piston means 60 by the compression spring 81, the compression spring causes the slidable member 77 to move the piston means 60 downwardly so as to move the cup-shaped element 97 away from engagement with the arm members 89. This relieves the engaging force previously exerted by the roller 91 on the upper end of the actuating member 93, and the control valve member 33 is free to move upwardly to seat on the control valve seat 28. Since previously both the control valve member 33 and the main valve member 30 were off their seats, the compression spring 36 was compressed, and as soon as the downward pressure on the control valve member 33 is released, the compression spring 36 moves it upwardly into seating engagement with the control valve seat 28 to stop fluid flow through the channel 35. As soon as this occurs, the fluid pressure within the cylindrical valve guide 24 quickly rises to the pressure in the inlet 11, and fluid flow through the restricted orifice 32 ceases, thus reducing the pressure differential thereon to zero. When the force exerted on the main valve member 30 by the pressure differential across the restricted orifice 32 falls below the force exerted by the compression spring 36 on the main valve member, the compression spring moves the main valve member 30 downwardly into seating position on the main valve seat 21, thus stopping all fluid flow from the inlet 11 to the pressure relief port 13 through the radial port 25. The fluid in the inlet 11 will then flow through the fluid flow passage 39, unseat the ball valve elements 53 and 50, in that sequence, and flow will resume from the inlet 11 to the outlet 12.

It will thus be appreciated that when the fluid pressure on the inlet 11 rises above a predetermined maximum, for which the compression spring 81 has been adjusted, the pressure relief valve means will open to relieve this pressure and will remain open until the fluid pressure in the outlet 12 falls below a predetermined minimum pressure, at which time the relief valve means will close and flow will be resumed from the inlet to the outlet. Consequently, by this device I provide a pressure regulating valve which will automatically operate to deliver a desired pressure, within predetermined limits, to a point of use.

It is to be noted that the radial port 55 and the control passage 56 communicate with the fluid flow passage 39 between the ball valve elements 50 and 53, and this is an important feature of the invention as it prevents a rise in pressure in the outlet 12 from opening the pressure relief valve means, which would occur if the lower end of the cylinder bore 59 communicated directly with the outlet 12. Such a rise in pressure in the outlet 12 may, of course, result from a variety of causes. For example, in aircraft use it is standard practice to provide an auxiliary fluid supply, such as a hand pump (not shown), fluid connected to the outlet 12, and the pressure in the outlet 12 may inadvertently be raised by such means above the normal desired pressure therein. The check valve means 43 is provided to prevent such a rise in pressure in the outlet 12 from being communicated to the piston means 60, as this might otherwise damage the parts.

During operation, a small amount of fluid may normally leak past the chevron packing 63 of the piston means 60, due to the relatively high fluid pressure in the lower end of the cylinder bore 59, which may be in the neighborhood of two thousand pounds per square inch, or higher. Also, it is frequently desirable in the use of my invention on aircraft to maintain a substantial back pressure in the discharge 13, as in the case of stratosphere flying when a substantial pressure must be maintained on the entire fluid system. This back pressure in the discharge 13 may frequently approach within fifty pounds per square inch the pressure in the inlet 11, and is frequently over one thousand pounds per square inch. As will be apparent, the actuating member 93 makes a sliding fit in the bushing 94, and no packing is provided therebetween. Consequently, due to the substantial fluid pressure in the discharge 13 and the valve chamber 14, fluid readily leaks past the actuating member 93 into the chamber 58. This leakage, together with the leakage past the piston means 60, will tend to accumulate in the chamber 58, raising the fluid pressure therein, which, if unchecked, would unbalance the action of the piston means 60 by exerting a downward pressure thereon. To obviate this difficulty, the bleeder valve is provided with the relatively weak compression spring 101, which, upon a slight rise in fluid pressure in the chamber 58, permits the ball valve member 101 to move off its seat to allow fluid in the chamber 58 to bleed directly into the valve chamber 14, to maintain the fluid pressure in the chamber 58 below a desired maximum.

The arrangement of the parts is also an important feature of my invention. It will be noted that the parts of the check valve means 43 all nest together and are readily insertable into and removable from the housing 10 through the outlet 12, which facilitates assembly and replacement. Likewise, the parts of the pressure relief valve means 37 all nest together and are insertable into and removable from the housing 10 through the inlet 11. Furthermore, the closure means 69 may be readily secured to or detached from the housing 10 to provide ready access to the interior of the chamber 58, the actuating means 86 being removable as a unit with the closure plate 70, which facilitates assembly and replacement of parts. Likewise, the piston means 60 may be readily removed from the housing 10, by merely first taking off the closure plate 70. All of these features, as well as the specific construction and design of the parts, contribute to simplicity and economy of manufacture and assembly, and are important in my invention.

Although I have shown and described a preferred embodiment of my invention, it is to be understood that I do not intend to be limited thereto but desire to be accorded the full scope of the following claims.

I claim as my invention:

1. In a regulating valve, the combination of: a housing having an inlet, an outlet, and a pressure relief port, one side of said housing being open to form a control chamber; a fluid flow passage connecting said inlet and said outlet; a cylinder in said housing having one end thereof in communication with said fluid flow passage; piston means in said cylinder; a pressure relief passage in said housing communicating between said inlet and said pressure relief port; pressure relief valve means in said pressure relief passage adapted to be opened to permit fluid flow from said inlet to said pressure relief port; closure means adapted to close said one side of said housing so as to close said control chamber; means for detachably securing said closure means to said housing; spring means mounted on said closure means and operatively connected to said piston means for restraining movement of said piston means when said closure means is secured to said housing; adjustment means for adjusting the tension of said spring means; and connecting means mounted on said closure means so as to be wholly enclosed in said control chamber, said connecting means operatively connecting said piston means and said pressure relief valve means whereby axial movement of said piston means causes said pressure relief valve means to open, said connecting means and said restraining means being removable from said housing with said closure means as a unit.

2. In a regulating valve, the combination of: a housing having an inlet, an outlet, and a pressure relief port, one side of said housing being open to form a control chamber; a fluid flow passage connecting said inlet and said outlet; a cylinder in said housing having one end thereof in communication with said fluid flow passage; piston means in said cylinder; a pressure relief passage in said housing communicating between said inlet and said pressure relief port; pressure relief valve means in said pressure relief passage adapted to be opened to permit fluid flow from said inlet to said pressure relief port; closure means adapted to close said one side of said housing so as to close said control chamber; means for detachably securing said closure means to said housing; a slidable member mounted in said closure means and engaging said piston means; a spring housing mounted on said closure means; spring means in said spring housing engaging said slidable member so as to normally urge it and said piston means in one direction; adjustment means mounted on said spring housing for changing the tension of said spring; and connecting means wholly within said control chamber and operatively connecting said piston means and said pressure relief valve means whereby axial movement of said piston means in an opposite direction against the action of said spring means causes said pressure relief valve means to open.

3. In a regulating valve, the combination of: a housing having an inlet, an outlet, and a pressure relief port, one side of said housing being open to form a control chamber; a fluid flow passage connecting said inlet and said outlet; a cylinder in said housing having one end thereof in communication with said fluid flow passage; piston means in said cylinder; a pressure relief passage in said housing communicating between said inlet and said pressure relief port; pressure relief valve means in said pressure relief passage adapted to be opened to permit fluid flow from said inlet to said pressure relief port; closure means adapted to close said one side of said housing so as to close said control chamber; means for detachably securing said closure means to said housing; a slidable member mounted in said closure means and engaging said piston means; a spring housing mounted on said closure means; spring means in said spring housing engaging said slidable member so as to normally urge it and said piston means in one direction; adjustment means mounted on said spring housing for changing the tension of said spring; connecting means in said control chamber and operatively connecting said piston means and said pressure relief valve means whereby axial movement of said piston means in an opposite direction against the action of said spring means causes said pressure relief valve means to open; and bleeder valve means communicating between said control chamber and said pressure relief port and adapted to open only when the fluid pressure in said control chamber rises above a predetermined value.

4. In a regulating valve, the combination of: a housing having an inlet, an outlet, and a pressure relief port; a fluid flow passage connecting said inlet and said outlet; check valve means in said fluid flow passage permitting fluid flow therethrough from said inlet to said outlet but preventing a reverse flow; a control chamber in said housing; a cylinder having one end thereof in open communication with said control chamber; piston means in said cylinder; a pressure relief passage in said housing communicating between said inlet and said pressure relief port; pressure relief valve means in said pressure relief passage adapted to be opened to permit a flow of fluid from said inlet to said pressure relief port; connecting means wholly within said control chamber operatively connecting one end of said piston means and said relief valve means so that axial movement of said piston means opens said pressure relief valve means, said connecting means including accelerating means for accelerating the opening movement of said pressure relief valve means; and a control passage in said housing connecting the other end of said piston means and said fluid flow pasasge for conveying fluid from said fluid flow passage to said piston means so as to axially move it in said cylinder.

5. In a regulating valve, the combination of: a housing having an inlet, an outlet, and a pressure relief port; an outlet passage connecting said inlet and said outlet; a control chamber in said housing; a cylinder having one end thereof in open communication with said outlet passage; piston means axially movable in said cylinder; a pressure relief passage in said housing communicating between said inlet and said pressure relief port; a cylindrical guide member in said relief passage and having one end in open communication with said inlet through said pressure relief passage and having an exhaust port at said end adapted to communicate between said inlet and said relief port, the other end of said guide member being closed; a tubular valve member of relatively large diameter axially movable in said guide member and having a restricted opening communicating between said inlet and the interior of said guide member; a main valve seat in said pressure relief passage between said exhaust port and said inlet, said tubular valve member being adapted to seat on said main valve seat; an auxiliary valve means between the interior of said guide member and said relief port and adapted to be opened to relieve the fluid pressure in said guide member to permit the fluid pressure in said inlet to unseat said tubular valve member to open fluid communication between said inlet and said pressure relief port through said exhaust port; and connecting means operatively connecting said piston and said auxiliary valve means whereby movement of said piston in said cylinder in response to a rise in fluid pressure in said outlet passage opens said auxiliary valve means.

6. In a regulating valve, the combination of: a housing having an inlet, an outlet, and a pressure relief port; an outlet passage connecting said inlet and said outlet; a control chamber in said housing; a cylinder having one end thereof in open communication with said outlet passage; check valve means in said outlet passage between said cylinder and said inlet; piston means axially movable in said cylinder; a pressure relief passage in said housing communicating between said inlet and said pressure relief port; a cylindrical guide member in said relief passage and having one end in open communication with said inlet through said pressure relief passage and having an exhaust port at said end adapted to communicate between said inlet and said relief port, the other end of said guide member being closed; a tubular valve member of relatively large diameter axially movable in said guide member and having a restricted opening communicating between said inlet and the interior of said guide member; a main valve seat in said pressure relief passage between said exhaust port and said inlet, said tubular valve member being adapted to seat on said main valve seat; an auxiliary valve means between the interior of said guide member and said relief port and adapted to be opened to relieve the fluid pressure in said guide member to permit the fluid pressure in said inlet to unseat said tubular valve member to open fluid communication between said inlet and said pressure relief port through said exhaust port; connecting means operatively connecting said piston and said auxiliary valve means whereby movement of said piston in said cylinder in response to a rise in fluid pressure in said outlet passage opens said auxiliary valve means; and spring means operatively connected to said piston and opposing movement of said piston in response to a rise in fluid pressure in said outlet passage.

7. In a regulating valve, the combination of: a housing having an inlet, an outlet, and a pressure relief port; an outlet passage connecting said inlet and said outlet; a control chamber in said housing; a cylinder having one end thereof in open communication with said outlet passage; piston means axially movable in said cylinder; a pressure relief passage in said housing communicating between said inlet and said pressure relief port; a cylindrical guide member in said relief passage and having one end in open communication with said inlet through said pressure relief passage and having an exhaust port at said end adapted to communicate between said inlet and said relief port, the other end of said guide member being closed; a tubular valve member of relatively large diameter axially movable in said guide member and having a restricted opening communicating between said inlet and the interior of said guide member; a main valve seat in said pressure relief passage between said exhaust port and said inlet, said tubular valve member being adapted to seat on said main valve seat; an auxiliary valve means between the interior of said guide member and said relief port and adapted to be opened to relieve the fluid pressure in said guide member to permit the fluid pressure in said inlet to unseat said tubular valve member to open fluid communication between said inlet and said pressure relief port through said exhaust port; compression spring means in said guide member between said tubular valve member and said auxiliary valve means for assisting the same to return to their respective seats; and connecting means operatively connecting said piston and said auxiliary valve means whereby movement of said piston in said cylinder in response to a rise in fluid pressure in said outlet passage opens said auxiliary valve means.

RODNEY B. CAMPBELL.